United States Patent [19]

Zimmerman

[11] Patent Number: 5,419,265
[45] Date of Patent: May 30, 1995

[54] STORAGE AREA PLACED ON THE DASHBOARD OF A MOTOR VEHICLE

[76] Inventor: Gerd Zimmerman, Kleine Beurhaüsstr 26, 44137 Dortmund I, Germany

[21] Appl. No.: 233,362

[22] Filed: Apr. 25, 1994

[30] Foreign Application Priority Data

Apr. 29, 1993 [DE] Germany ............. 9306431 U

[51] Int. Cl.⁶ ............................................. A47B 23/00
[52] U.S. Cl. ............................................. 108/45; 108/25
[58] Field of Search ............................. 108/44, 45, 46, 25

[56] References Cited

U.S. PATENT DOCUMENTS

| | | | |
|---|---|---|---|
| 2,039,922 | 5/1936 | Neats et al. | 108/25 |
| 2,650,870 | 9/1953 | Carpenter | 108/45 |
| 2,689,156 | 9/1954 | Kolander | 108/45 |
| 3,104,895 | 9/1963 | Feverbach et al. | 108/45 |
| 3,717,111 | 2/1973 | Volberding | 108/45 |
| 3,893,569 | 7/1975 | Hoch | 108/44 |
| 4,174,669 | 11/1979 | Lalonde | 108/45 |
| 4,577,788 | 3/1986 | Richardson | 108/44 |
| 4,896,611 | 1/1990 | Lorenzini | 108/45 |
| 5,106,003 | 4/1992 | Ma | 108/44 |
| 5,170,720 | 12/1992 | Suheurer | 108/44 |

*Primary Examiner*—Kenneth J. Dorner
*Assistant Examiner*—Janet M. Wilkens
*Attorney, Agent, or Firm*—Vickers, Daniels & Young

[57] ABSTRACT

A tray for use in a truck having a peaked dash is provided with a support yoke and suction cups attached to the tray at its windshield end. Because the mounting mechanism is simple and all at the windshield end, the tray is easily mounted and dismounted and is unlikely to interfere with dashboard gauges or instruments.

6 Claims, 1 Drawing Sheet

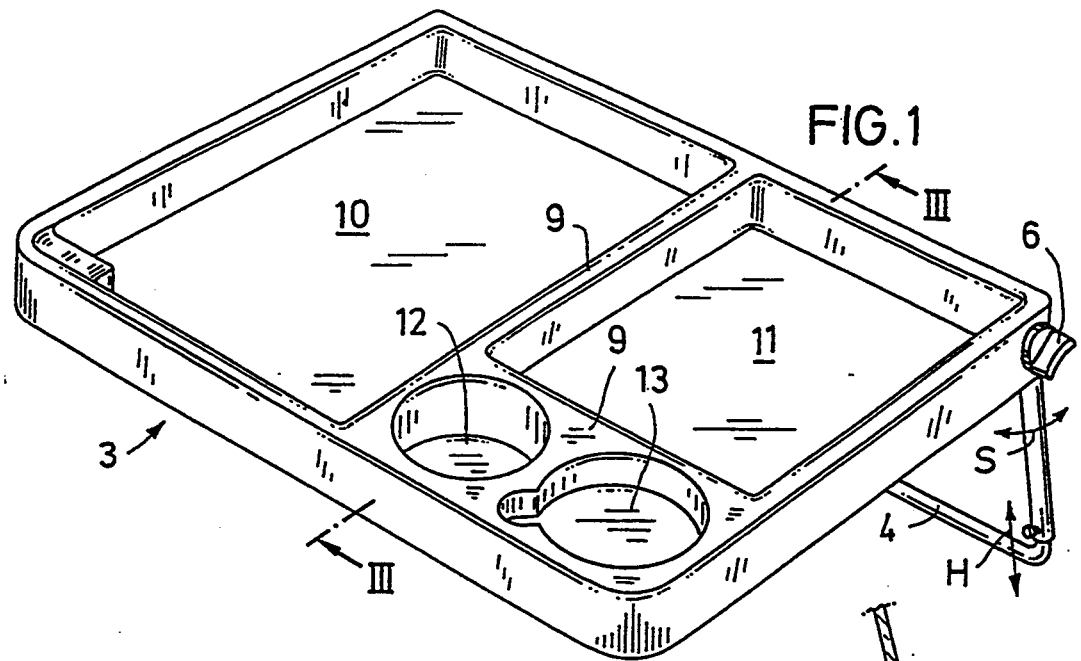
FIG.1
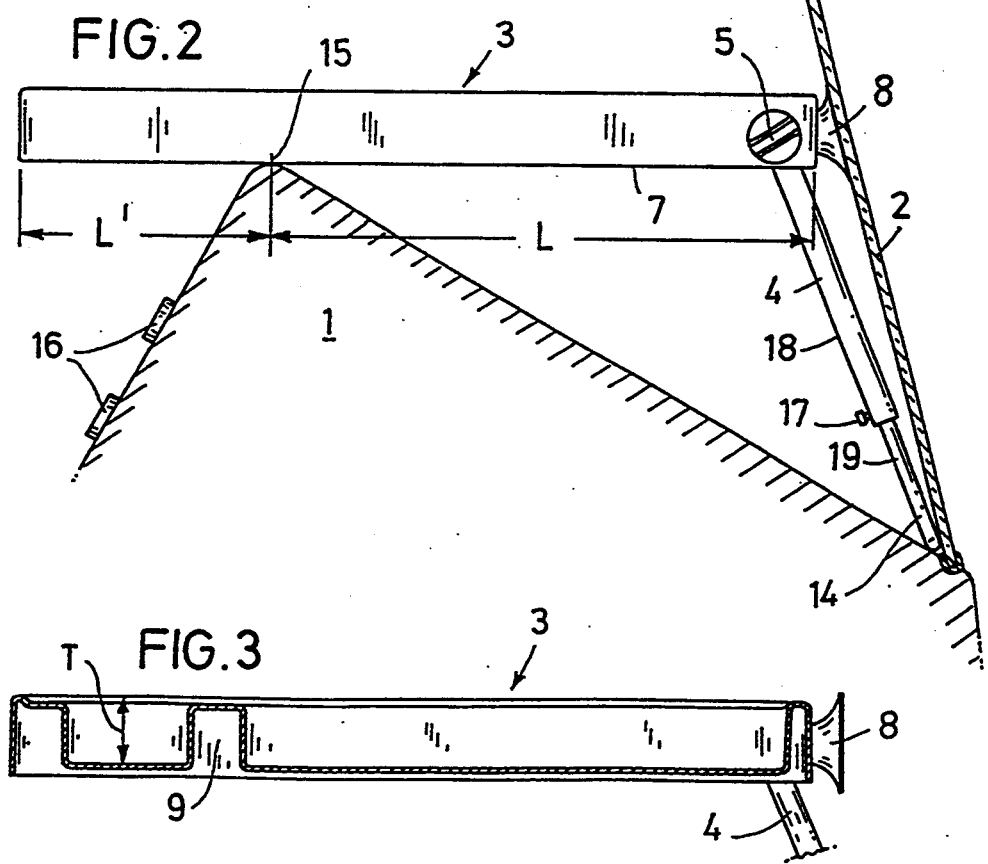
FIG.2
FIG.3

STORAGE AREA PLACED ON THE DASHBOARD OF A MOTOR VEHICLE

BACKGROUND OF THE INVENTION

The invention relates to a storage area placed on the dashboard of a motor vehicle and is particularly directed to use in trucks.

Storage areas for motor vehicles are known in the art. Often, they take the form of trough-like integrated components in the instrument panel. As a result of the relatively narrow design of the dashboard, and because of the vehicle parts that are located underneath the surface of the dashboard, the known storage areas are small in volume and surface area. In practice, this results in the fact that only small items, such as eyeglasses and similar objects, can be kept in the known storage areas.

In many motor vehicles, including long haul trucks, it is desirable that the driver have at his disposal a larger storage area. This holds true especially for rest periods and breaks. It is expedient for the driver to have a storage area of sufficient size for food, as well as cups, cans, and similar items.

SUMMARY OF THE INVENTION

The present invention eliminates these problems and provides a storage area which can be used universally, or at least by the overwhelming majority of trucks. In accordance with the present invention, there is provided a large surface upon which objects can be placed without slipping, which is easily mounted in the area of the dashboard within reach of the driver, but which is also easily removable with few hand movements and stowed away inside the vehicle in a space-saving manner.

In accordance with the invention a tray is provided which lies upon the dashboard and is supported on the dashboard an/or windshield in a removable manner. Further in accordance with the invention a tray is provided which is useable when the vehicle is stationary or while the vehicle is in motion.

Further in accordance with the invention, since many dashboards of trucks exhibit a somewhat roof-like shape having a peak, the tray has at least one adjustable support yoke on the windshield side. This is made possible through the use of a lag hinge between the yoke and the tray. The lag hinge can be locked by means of a clamping screw. In place of the support yoke, individual supports could be used as well. It is also possible to provide useful support devices on the instrument panel side in order to give the tray sufficient support on the dashboard.

Yet further in accordance with the invention the tray is supported at the windshield by means of one or more suction cups.

Still further in accordance with the invention, the tray is provided with a plurality of recesses of various depths and contours corresponding to normally used items such as cups, bottles, cutlery and the like.

Yet further in accordance with the invention the tray has an underside provided with a protective covering made of rubber, felt or the like.

Yet further in accordance with the invention, the tray has a length dimension and is adopted to have about two-thirds of its length forward of the peak of the dash whereby the center of gravity of the tray, when loaded or unloaded, is forward of the peak and the tray is reliably supported.

BRIEF DESCRIPTION OF THE EMBODIMENT

The invention is explained in more detail in the following description of the preferred embodiment where in the figures show:

FIG. 1 shows the tray in a perspective representation from the top;

FIG. 2 shows a side view of the tray with the dashboard is indicate in cross-section; and, FIG. 3 shows a section in accordance with the line III—III in FIG. 1.

Referring now to FIG. 2, the dashboard 1 and windshield 2 of a truck are shown schematically in cross-section. The dashboard 1 is roof shaped having a peak spaced from the windshield, a forward surface sloping downwardly toward the windshield 2 and a rearward surface sloping downwardly away from the windshield in which instruments 16 are disposed. The tray 3 is disposed on top of the dashboard 1 with a support point 15 resting on the peak of the dashboard. The length of the tray L plus L1 is selected so that the length L of the tray forward of the support point 15 is about two thirds of the overall length L plus L1. The remaining length L1 is supported as a cantilever over the instrument portion of the dashboard 1.

At the windshield, the tray 3 is supported by means of suction cups 8 and a support yoke 4. The support yoke 4 consists of two telescoping tubes 18 and 19 that can locked at a selected length by means of a locking screw 17. The support yoke 4 is carried at the tray 3 by means of a lag hinge 5. The lag hinge 5 can be locked by means of a clamping screw 6.

In use the tray 3 is attached by setting the tray 3 on the support point 15, adjusting the length of the support yoke 4 so its bottom rests at the place where the windshield meets the dashboard and pressing the suction cups 8 against the windshield 2. After the tray is first mounted, it can be repeatedly mounted and dismounted without further adjustment.

It can be seen in FIG. 1 that the tray 3 itself exhibits several storage surfaces 10, 11, 12, and 13. In the preferred embodiment, the storage surface 13 is provided with an outer contour accepting a cup with a handle. The depth T of the cup recess 13 and the can recess 12 is sufficient to hold a bottle or can. The individual recesses are separated from one another by means of profile webbing that is given the general designation 9. Larger rectangular recesses 10, 11 are provided to hold sandwiches, chips and the like. Both the underside of the tray 3 and the free end of 14 of the support yoke 4 can be provided with a protective cover made of rubber or felt in order to prevent unwanted marks on the surface of the dashboard 1.

I claim:

1. A tray adapted for use in a motor vehicle having a windshield and a dashboard, said dashboard having a highest point spaced from said windshield, said tray comprising a generally flat support surface having a given length, a forward end and a rearward end, a support yoke hingedly connected to said support surface at said forward end, at least one suction cup attached to said support surface at said forward end, whereby said support surface may be disposed horizontally resting on said dashboard at a support point remote from said windshield and supported at said forward end by said yoke and said suction cup.

2. The tray of claim 1 wherein said yoke is adjustable in height.

3. The tray of claim 2 wherein said yoke comprises two vertical members having bottoms and a horizontal member interconnecting the bottoms of said vertical members.

4. The tray of the claim 1 wherein said yoke is connected to said support surface by lockable hinges.

5. The tray of claim 4 wherein said lockable hinges are lockable by means of clamping screws.

6. The tray of claim 1 wherein said support surface is provided with a plurality of recesses of different depth.

* * * * *